United States Patent
Jo et al.

(10) Patent No.: US 7,663,830 B2
(45) Date of Patent: Feb. 16, 2010

(54) METHOD OF FORMING SERVO DATA OF HDD AND SELF SERVO WRITE METHOD USING THE SAME

(75) Inventors: Ki-Hyun Jo, Suwon-si (KR); Seok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 751 days.

(21) Appl. No.: 11/325,576

(22) Filed: Jan. 5, 2006

(65) Prior Publication Data

US 2006/0152837 A1      Jul. 13, 2006

(30) Foreign Application Priority Data

Jan. 13, 2005      (KR)      ............ 10-2005-0003180

(51) Int. Cl.
*G11B 5/09*      (2006.01)
(52) U.S. Cl. ............... 360/49; 360/29; 360/40; 360/48
(58) Field of Classification Search ............ 360/31, 360/39–41, 48–49, 51, 53, 65, 77.02
See application file for complete search history.

(56) References Cited

U.S. PATENT DOCUMENTS

| | | | | |
|---|---|---|---|---|
| 5,345,342 A * | 9/1994 | Abbott et al. | ............ | 360/48 |
| 5,384,671 A * | 1/1995 | Fisher | ............ | 360/51 |
| 5,432,820 A * | 7/1995 | Sugawara et al. | ............ | 375/341 |
| 5,477,222 A * | 12/1995 | Kahlman et al. | ............ | 341/95 |
| 5,661,760 A * | 8/1997 | Patapoutian et al. | ............ | 375/341 |
| 5,737,142 A * | 4/1998 | Zook | ............ | 360/49 |
| 5,949,358 A * | 9/1999 | Volz et al. | ............ | 341/102 |
| 6,032,284 A * | 2/2000 | Bliss | ............ | 714/792 |
| 6,115,198 A * | 9/2000 | Reed et al. | ............ | 360/46 |
| 6,201,652 B1 * | 3/2001 | Rezzi et al. | ............ | 360/40 |
| 6,233,715 B1 * | 5/2001 | Kuki et al. | ............ | 714/795 |
| 6,275,175 B1 * | 8/2001 | Kahlman et al. | ............ | 341/59 |
| 6,587,977 B1 * | 7/2003 | Riggle et al. | ............ | 714/701 |
| 6,597,297 B1 * | 7/2003 | Kahlmann | ............ | 341/102 |
| 6,616,728 B2 * | 9/2003 | Fife | ............ | 75/255 |
| 6,751,774 B2 * | 6/2004 | Aziz | ............ | 714/792 |
| 6,934,102 B2 * | 8/2005 | Dati et al. | ............ | 360/39 |
| 6,934,114 B1 * | 8/2005 | Codilian et al. | ............ | 360/77.08 |
| 7,082,005 B2 * | 7/2006 | Annampedu et al. | ............ | 360/51 |
| 7,126,775 B1 * | 10/2006 | Zook | ............ | 360/49 |
| 7,133,232 B2 * | 11/2006 | Taguchi et al. | ............ | 360/65 |
| 2002/0174400 A1 * | 11/2002 | Yamada | ............ | 714/786 |
| 2003/0011918 A1 | 1/2003 | Heydari | | |

FOREIGN PATENT DOCUMENTS

| | | |
|---|---|---|
| JP | 08-235798 | 9/1996 |
| JP | 10-199172 | 7/1998 |
| KR | 1999-0057753 | 7/1999 |

* cited by examiner

*Primary Examiner*—Dismery E Mercedes
(74) *Attorney, Agent, or Firm*—Staas & Halsey LLP (57) ABSTRACT

A method of forming servo data, and a self-servo write method using the same, the method including partial response maximum likelihood (PRML)-coding servo data into m bits in n-bit units; multiplying each bit of the PRML-coded result by an o multiple; and converting a bitsream obtained in the multiplying to ((m/n)–p) bits in m/n-bit units.

18 Claims, 6 Drawing Sheets

METHOD OF FORMING SERVO DATA OF HDD AND SELF SERVO WRITE METHOD USING THE SAME

CROSS-REFERENCE TO RELATED APPLICATIONS

This application claims the benefit of Korean Patent Application No. 10-2005-0003180, filed on Jan. 13, 2005, in the Korean Intellectual Property Office, the disclosure of which is incorporated herein by reference.

BACKGROUND OF THE INVENTION

1. Field of the Invention

The present invention relates to a method of writing servo data in a hard disc drive (HDD), and, more particularly, to a method of forming servo data that enables a reduction of capacity of a buffer memory used to buffer the servo data, and a self-servo write method using the same.

2. Description of the Related Art

A hard disc drive (HDD) is a magnetic information storage device. Information is written on concentric tracks formed on the surface of one or more discs included in the HDD. The discs are assembled so that they can be rotated by a spindle motor, and the information is accessed by a head assembled on an actuator arm rotated by a voice coil motor (VCM). The VCM rotates the actuator arm in response to being activated by a current, and therefore moves the head. The head must be accurately positioned on the track of the disc to ensure proper writing and reading of the information during operation of the HDD.

Typically, a head position control is performed by a servo control circuit, which detects and controls the positions of the head using servo data written on the disc.

For the head to correctly follow the track, the servo data should be written on the tracks. A servo track write (STW) is a process of writing the servo data on the discs magnetically.

Figure 1:
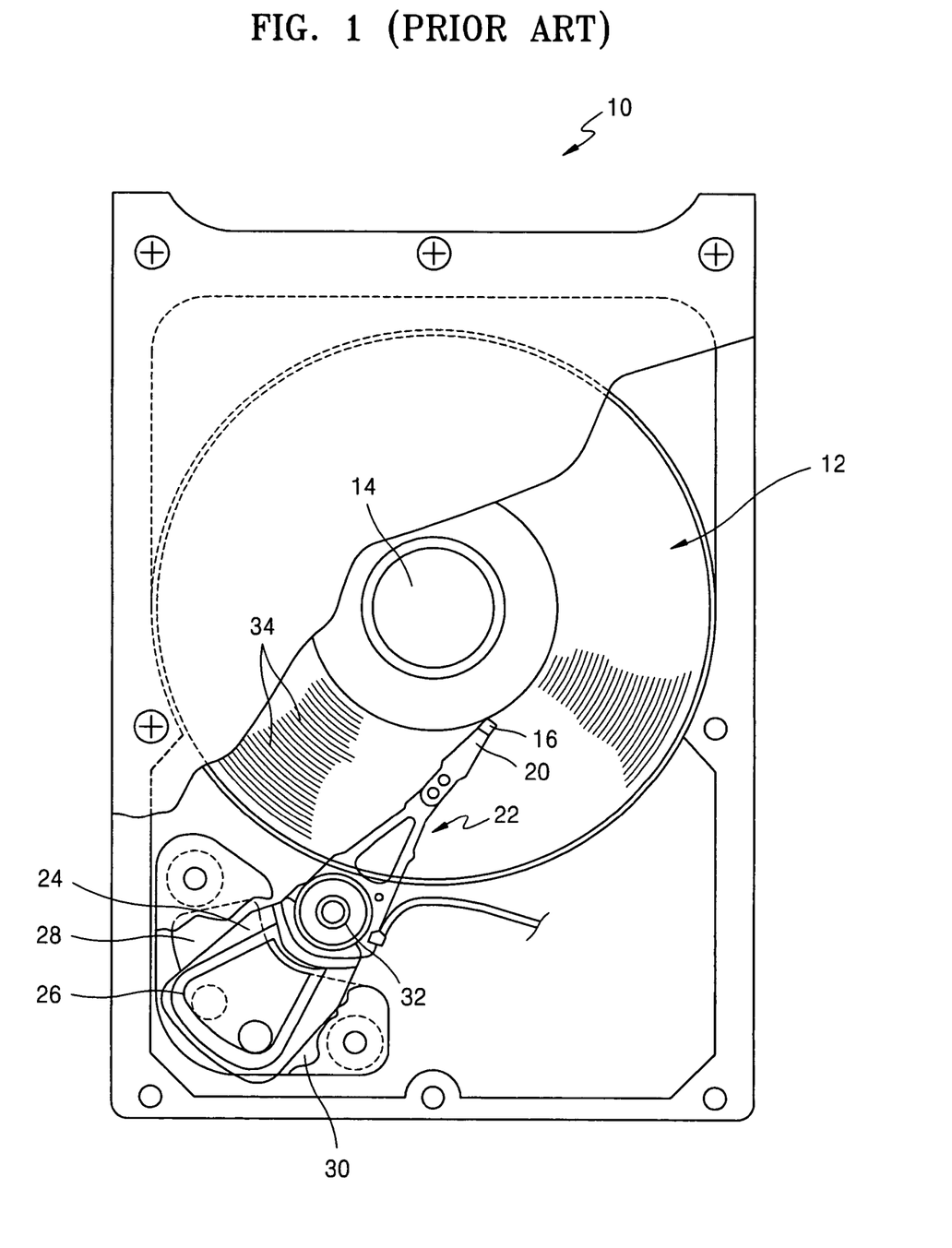
FIG. 1 is a schematic plan view illustrating an HDA of an HDD.

FIG. 1 is a schematic plan view illustrating a head disc assembly (HDA) 10 of an HDD.

Referring to FIG. 1, the HDA 10 includes at least one disc 12 rotated by a spindle motor 14. The HDA 10 also includes a head 16 located adjacent to the disc surface.

The head 16 can read information from the rotating disc 12 by sensing a magnetic field formed on the disc 12, or write information to the disc 12 by magnetizing the disc 12. Typically, the head 16 is limited to one disc surface. Though a single head 16 is described in the discussion of FIG. 1, the head 16 includes a write head 16, which magnetizes the disc 12, and a read head 16, which senses a magnetic field of the disc 12. The read head 16 is composed of a magneto-resistive (MR) component.

The head 16 can be integrated into a slider (not shown) which is combined with a suspension 20. The suspension 20 generates an air bearing between the head 16 and the surface of the disc 12. The suspension 20 is combined with a head stack assembly (HSA) 22. The HSA 22 is attached to an actuator arm 24 having a voice coil 26. The voice coil 26 is located adjacent to a magnetic assembly 28 specifying a voice coil motor (VCM) 30. A current supplied to the voice coil 26 generates a torque which rotates the actuator arm 24 around a bearing assembly 32. The rotation of the actuator arm 24 moves the head 16 across the disc surface.

Information is stored in concentric tracks of the disc 12. In general, each track 34 includes a plurality of sectors. Each sector includes a servo field and a data field.

Figure 2:
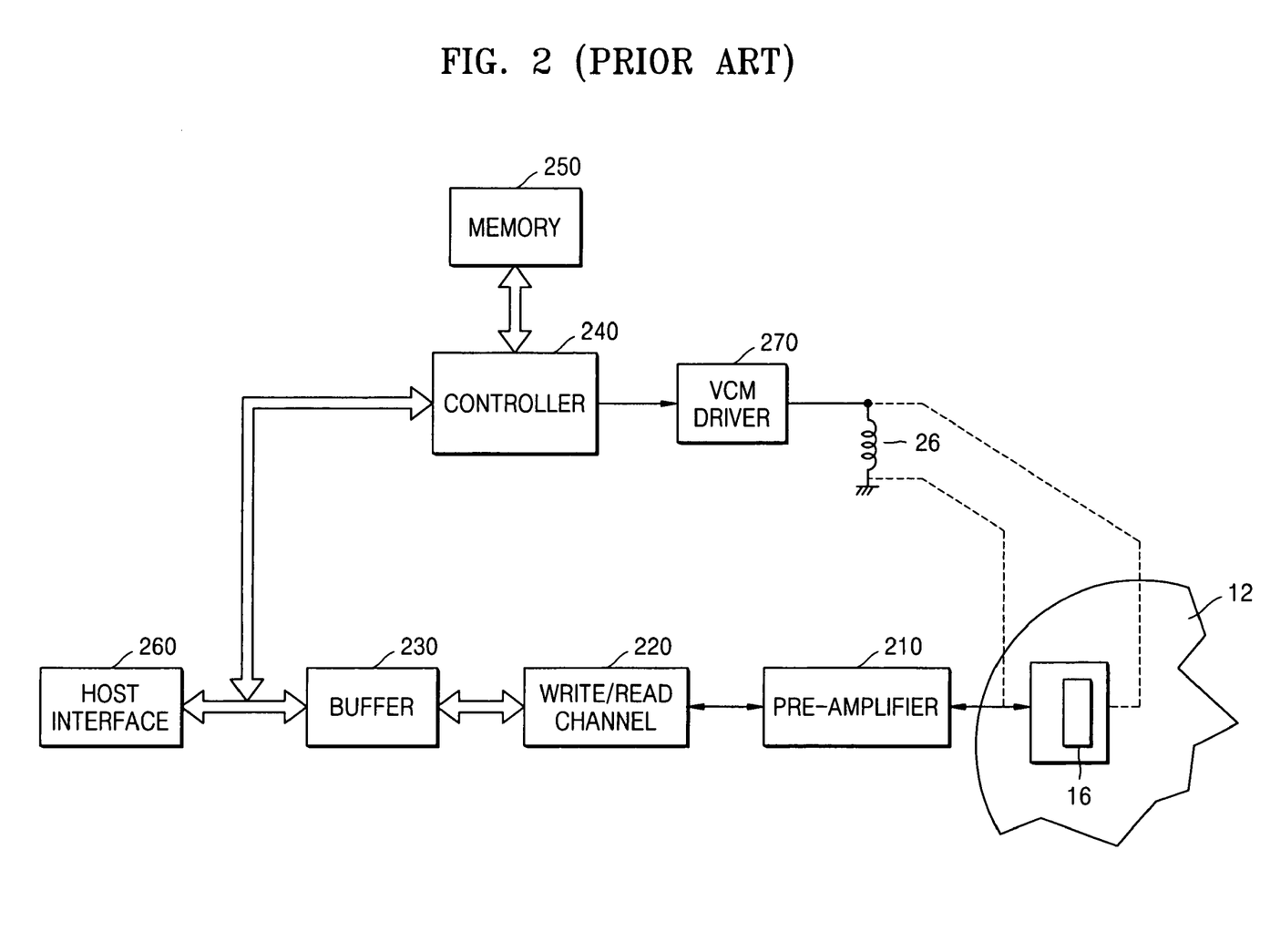
FIG. 2 is a block diagram illustrating an electrical circuit used to control the HDD shown in FIG. 1.

FIG. 2 is a block diagram illustrating an electrical circuit used to control the HDD shown in FIG. 1.

Referring to FIG. 2, the electrical circuit includes a pre-amplifier 210, a write/read channel 220, a buffer 230, a controller 240, a memory 250, a host interface 260, and a VCM driver 270. A circuit including the pre-amplifier 210 and the write/read channel 220 is called a write/read circuit.

In the memory 250, firmware used to control the HDD, specification information regarding a servo address/index signal of a reference servo pattern, and specification information regarding a servo address/index signal of final servo data are stored. Here, the memory 250 is a flash memory, which is a non-volatile memory.

In a data read mode, the HDD amplifies an electrical signal sensed from the disc 12 by the head 16 using the pre-amplifier 210 for convenience of signal processing. The HDD encodes the amplified analog signal into a digital signal that can be read by a host device (not shown) using the write/read channel 220, converts the digital signal to stream data, temporarily stores the stream data in the buffer 230, and transmits the stream data to the host device via the host interface 260.

In a data write mode, the HDD receives data from the host device via the host interface 260, temporarily stores the received data in the buffer 230, sequentially outputs the data stored in the buffer 230, converts the sequentially output data to a binary data stream suitable for a write channel using the write/read channel 220, and applies a write current amplified by the pre-amplifier 210 to the disc 12 using the head 16.

The controller 240 analyzes a command received from the host device through the host interface 260, and performs a corresponding control.

A self-servo write is performed in a pattern of a self-test, which is executed when the HDD is booted, rather than by a command from a host device. When the self-servo write is performed, the controller 240 writes final servo data (54 of FIGS. 4A and 4B, which will be discussed later) on a reference disc and blank discs while following tracks by referring to reference servo data (52 of FIGS. 4A and 4B) written on the reference disc.

Figure 4A:
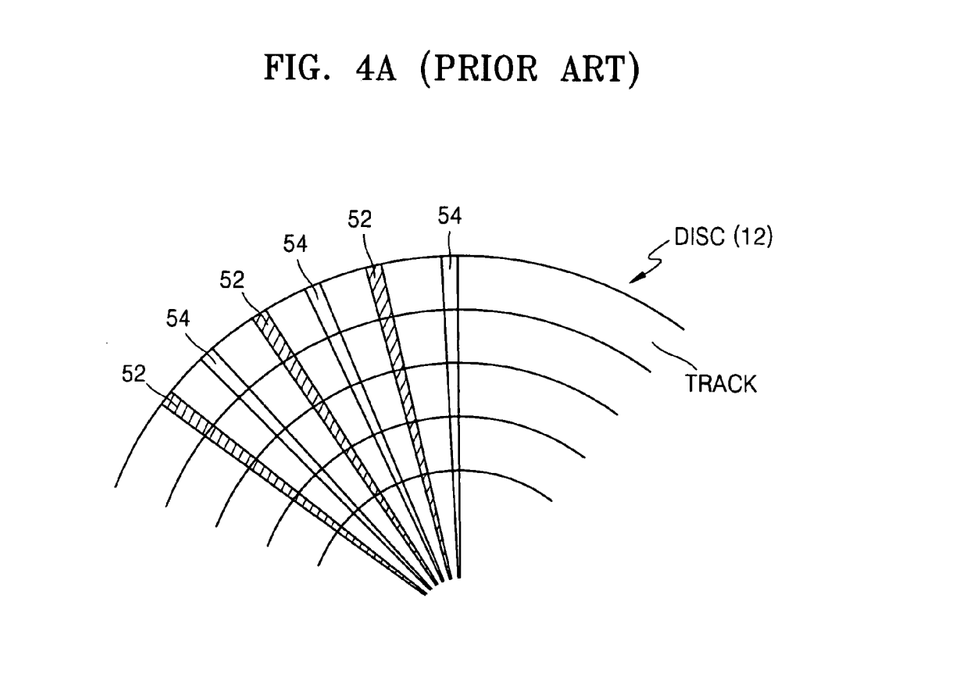
FIGS. 4A and 4B illustrate a self-servo write method.
Figure 4B:
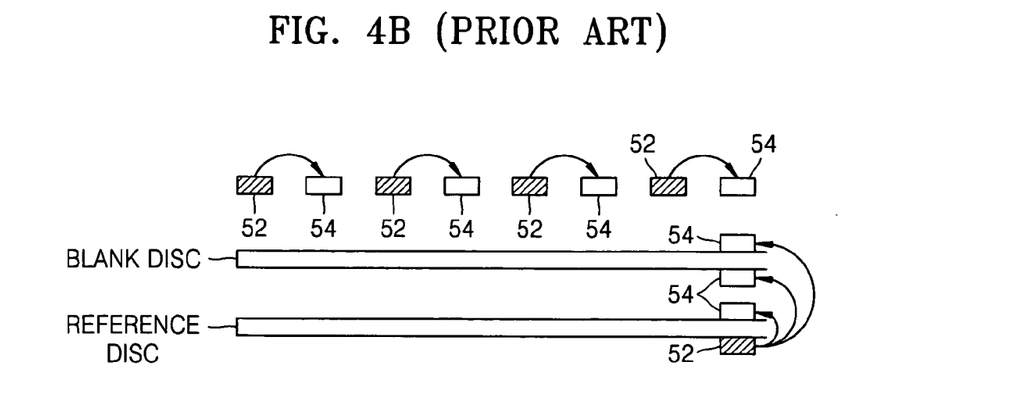

In detail, the controller 240 controls the HDD to reproduce the reference servo data 52 sequentially while following the tracks of the reference disc by controlling the VCM 30, store the reproduced reference servo data 52 in the buffer 230, generate the final servo data 54 by referring to the reference servo data 52 stored in the buffer 230, and simultaneously write the generated final servo data 54 on the reference disc and the blank discs of the HDA 10.

Figure 3:
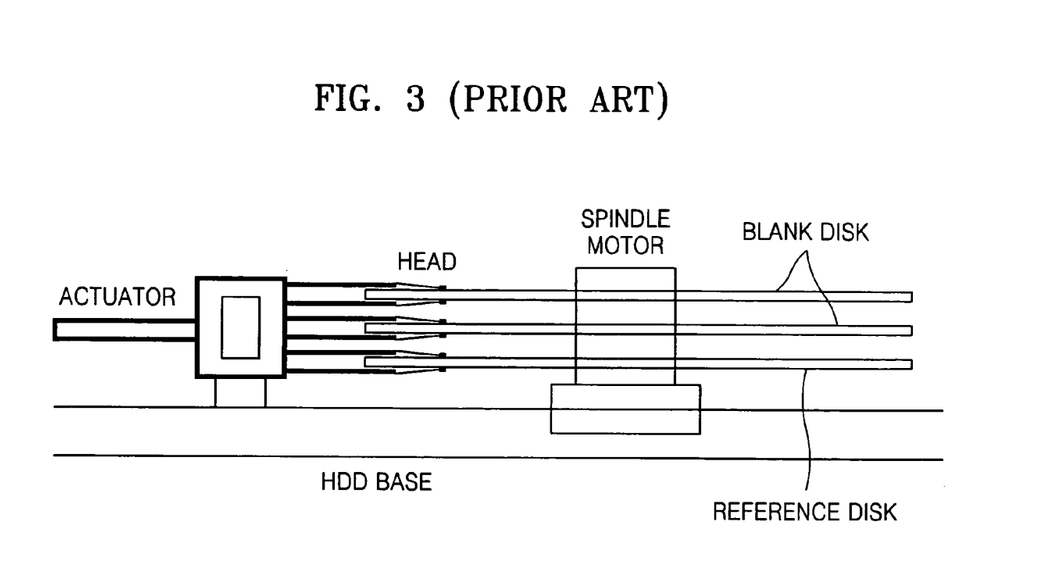
FIG. 3 illustrates a state in which discs are combined with the HAD.

FIG. 3 illustrates a state in which multiple discs are provided in the HDA 10.

In the operation of a self-servo write method, the HDA 10 includes a reference disc and at least one blank disc. For convenience of description, two blank discs are shown in FIG. 3.

FIGS. 4A and 4B illustrate the self-servo write method. The reference servo data 52 is referred to in order to write the final servo data 54. FIG. 4A shows an example in which the reference servo data 52 is written radially on a disc. The number of radial lines is properly selected according to the disc.

The final servo data 54 is written by referring to the reference servo data 52.

Referring to FIG. 4B, the reference servo data 52 is written on one (reference disc) of the discs of an HDA, and, moreover, on only one surface of the reference disc. The final servo data 54 is written on the other discs, and the other surface of the reference disc, by referring to the reference servo data 52 written on the one side of the reference disc. The reference disc can be written in advance before the discs are assembled into the HDA, i.e., written offline, or written after the discs are assembled into the HDA, i.e., written online.

When the final servo data 54 is written as a result of a write operation, the reference servo data 52 is located at data fields of the sectors of the reference disc. A process of writing the final servo data 54 by referring to the reference servo data 52 is called a servo copy process.

Typically, servo data is written through a partial response maximum likelihood (PRML) coding process used to raise symmetricity and discrimination, and a multiplying process used to raise timing resolution.

Table 1 shows an example in which 2-bit gray code is 2/8 coded.

TABLE 1

| Gray code | Code symbol |
| --- | --- |
| 10 | 1111 0000 |
| 00 | 0011 1100 |
| 11 | 1100 0011 |
| 01 | 0000 1111 |

The 2/8 coding converts analog binary data to a format suitable for PR4 PRML detection. Generally, PRML decoding has better performance than analog peak detection. Accordingly, the servo data can be read exactly. A technique related to servo data coding suitable for the PRML detection is disclosed in U.S. Pat. Publication No. 2003-0011918 (published Jan. 16, 2003).

The accuracy of the servo data should also be maintained in terms of timing. In other words, even if the contents of the servo data are accurate, the timing must also be correct. Thus, to easily detect more correct timing of the servo data, PRML coded servo data is written by multiplying the servo data in bit units.

Table 2 shows that the 2/8-coded 2-bit gray code is multiplied by repeating each bit of the 2/8 coded data.

TABLE 2

| Gray code | Gray code (2/8) | Gray code (2-multiplying) |
| --- | --- | --- |
| 10 | 1111 0000 | 11111111 00000000 |
| 00 | 0011 1100 | 00001111 11110000 |
| 11 | 1100 0011 | 11110000 00001111 |
| 01 | 0000 1111 | 00000000 11111111 |

2-multiplying means that each bit of the 2/8-coded gray code is repeated, so that each bit is represented twice.

By applying the 2/8-coding and 2-multiplying, the 2-bit gray code is converted to 16-bit gray code.

This operation means that a memory having eight times the capacity of the servo data is needed to write the servo data.

In the self-servo write method, the write/read channel 220 of the HDD generates the final servo data 54 from the reference servo data 52 read from the reference disc, stores the generated final servo data 54 in an internal buffer memory, and writes the final servo data 54 stored in the buffer memory to servo fields of the disc 12.

For example, when the length of a servo pattern is 160 bits, the buffer memory must have a capacity of approximately 160 bytes. Considering that most integrated circuits have buffer memories of 128 bytes, which are a multiple of an 8-bit unit, the write/read channel 220 needs two 128-byte buffer memories. This imposes a burden on manufacturing cost, and reduces memory utilization.

SUMMARY OF THE INVENTION

The present invention provides a servo data forming method that enables a reduction of the capacity of a buffer memory used to buffer servo data in a write/read channel.

The present invention also provides a self-servo write method using the servo data forming method.

Additional aspects and/or advantages of the invention will be set forth in part in the description which follows and, in part, will be apparent from the description, or may be learned by practice of the invention.

According to an aspect of the present invention, there is provided a servo data forming method comprising: partial response maximum likelihood (PRML)-coding servo data into m bits in n-bit units; multiplying each bit of the PRML-coded result by an o multiple; and converting (or down-multiplying) a bitstream obtained in the multiplying to ((m/n)−p) bits in m/n-bit units.

According to another aspect of the present invention, there is provided a self-servo write method comprising: partial response maximum likelihood (PRML)-coding servo data into m bits in n-bit units; multiplying each bit of the PRML-coded result by an o multiple; down-multiplying a bitstream obtained in the multiplying to ((m/n)−p) bits in m/n-bit units; and writing the bitstream obtained in the down-multiplying by synchronizing with a clock signal having a frequency f used to write the bitstream obtained in the multiplying.

The self-servo write method may further comprise: generating a clock signal having a frequency of $(m/n)/((m/n)-p)*f$; and writing the bitstream obtained in the multiplying by synchronizing with the clock signal having the frequency of $(m/n)/((m/n)-p)*f$.

According to another aspect of the present invention, there is provided a method of forming servo data, the method comprising: converting a bitstream of PRML-coded servo data, in which each bit has been repeated by a predetermined multiple, into a reduced bitstream of m/n−p bits in m/n-bit units; wherein the PRML-coded servo data comprises m bits in n-bit units.

According to another aspect of the present invention, there is provided a method of forming servo data, the method comprising: converting a bitstream of PRML-coded servo data, in which each bit has been repeated by a predetermined multiple, into a reduced bitstream; wherein the reduced bitstream comprises units of bits that are each at least one bit shorter than units of bits of the bitstream of PRML-coded servo data.

According to another aspect of the present invention, there is provided a method of down-multiplying a bitstream of PRML-coded servo data in which each bit has been repeated by a predetermined multiple, the method comprising: reducing each of a plurality of units of bits by at least one bit; wherein the bits of each of the respective units have a common value.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5A:
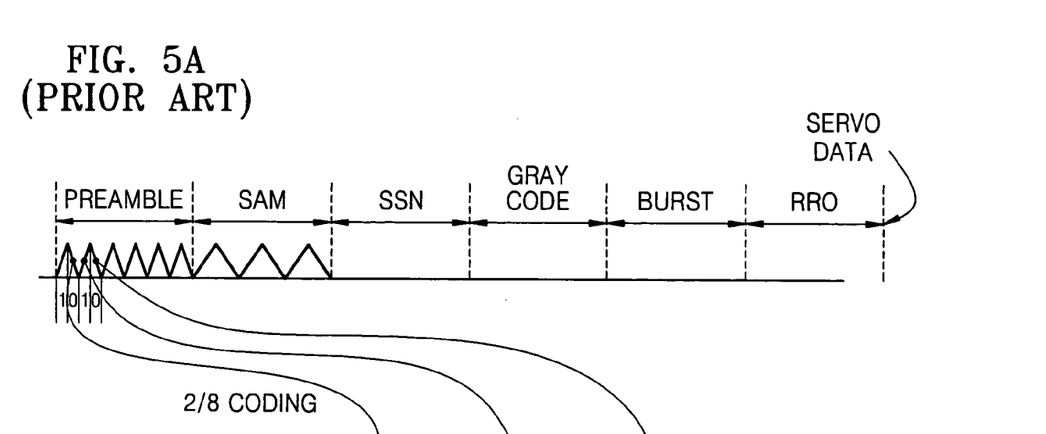
FIGS. 5A through 5C illustrate a conventional servo data writing method.
Figure 5B:
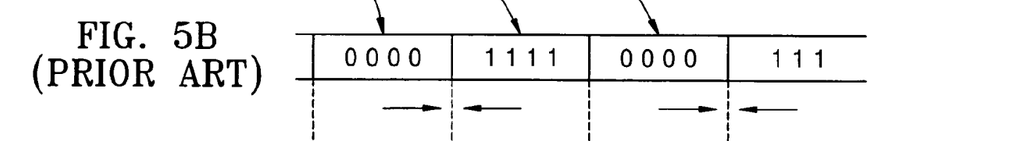
Figure 5C:
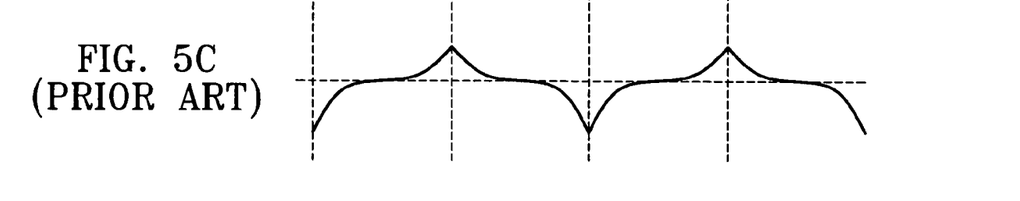

FIGS. 5A through 5C illustrate a conventional servo data writing method.

FIG. 5A illustrates servo data. The servo data includes a preamble, a servo address mark (SAM), a servo sector number (SSN), gray code, burst, and repeatable run out (RRO).

The preamble, which is used in automatic gain control of a servo circuit and phase synchronization of a servo bit signal, has a constant frequency. The SAM, which is generated after the preamble, has a unique pattern having a minimum detection possibility over the entire track. The SAM provides a basic timing standard on the servo gray code, index, and burst. The gray code and index can include a track address, a sector address, and a head number. The burst is used to generate a position error signal (PES). A popular method is a four-burst (A through D) method in which four bursts having different phases in a radius direction are used. The RRO is used to compensate for an RRO component.

Referring to FIG. 5A, in the preamble, logic 1 and logic 0 are arranged one by one.

FIG. 5B shows that the preamble shown in FIG. 5A is 2/8-coded and written on a disc. As the 2/8-coding result, the logic 1 in the preamble is represented by a bitstream of "1111," and the logic 0 is represented by a bitstream of "0000." Arrows shown in FIG. 5B indicate the directions of magnetic fields generated on the disc.

FIG. 5C shows an example of an analog signal read from the preamble shown in FIG. 5B. Referring to FIG. 5C, where the slope of the analog signal rises up is a field in which data of logic 0 is recorded on the disc, and where the slope of the analog signal falls down is a field in which data of the logic 1 is recorded.

Figure 6:
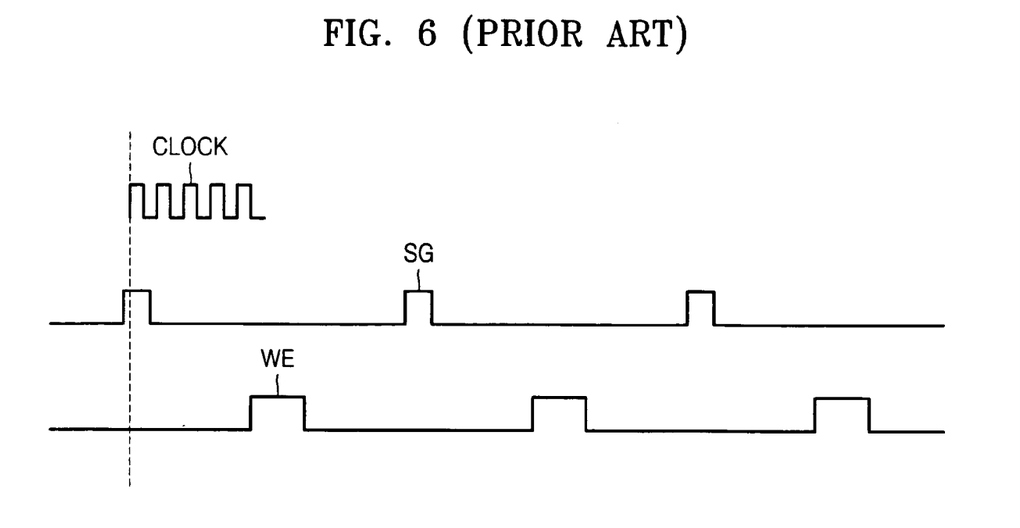
FIG. 6 is a timing diagram illustrating timing used to read servo data.

FIG. 6 is a timing diagram illustrating timing used to read servo data. Referring to FIG. 6, a clock signal frequency of the write/read channel 220 is locked with a servo synch signal of the servo data. When the clock signal frequency of the write/read channel 220 is locked and a SAM is detected, a servo gate signal SG is generated. The write/read channel 220 of the HDD reads a servo address/index and gray code by synchronizing with the servo gate signal SG. A servo write enable signal WE used to write final servo data is also generated by synchronizing with the servo gate signal SG.

If the servo gate signal SG is not generated with a correct phase, the servo address/index and the gray code cannot be read correctly. Even if the servo gate signal SG is generated with the correct phase, the write resolution of the servo write enable signal WE is determined according to the clock signal frequency. That is, the higher the frequency used to write the servo data, the higher the write accuracy of the final servo data.

Accordingly, to ensure correct timing, the servo data is multiplied and written. That is, the servo data can be read at the more correct timing by writing the servo data with more than double resolution by 2-multiplying 2/8-coded servo data.

When reference servo data is read, the controller 240 forms the final servo data. The final servo data is a bitstream including a preamble, a SAM, gray code, and index, and bursts A through D.

The final servo data is provided to the write/read channel 220. The write/read channel 220 2/8-codes and 2-multiplies the final servo data provided from the controller 240 and provides the 2/8-coded and 2-multiplied final servo data to the pre-amplifier 210. The pre-amplifier 210 writes the 2/8-coded and 2-multiplied final servo data provided from the write/read channel 220 on the disc 12.

To convert the final servo data provided by the controller 240 to the 2/8-coded and 2-multiplied final servo data, the write/read channel 220 needs a buffer memory having more than eight times the capacity of the final servo data.

For example, if the servo data is comprised of 160 bits, the write/read channel 220 must have a buffer memory of at least approximately 160 bytes. This is a burden when the HDD system is designed.

Figure 7:
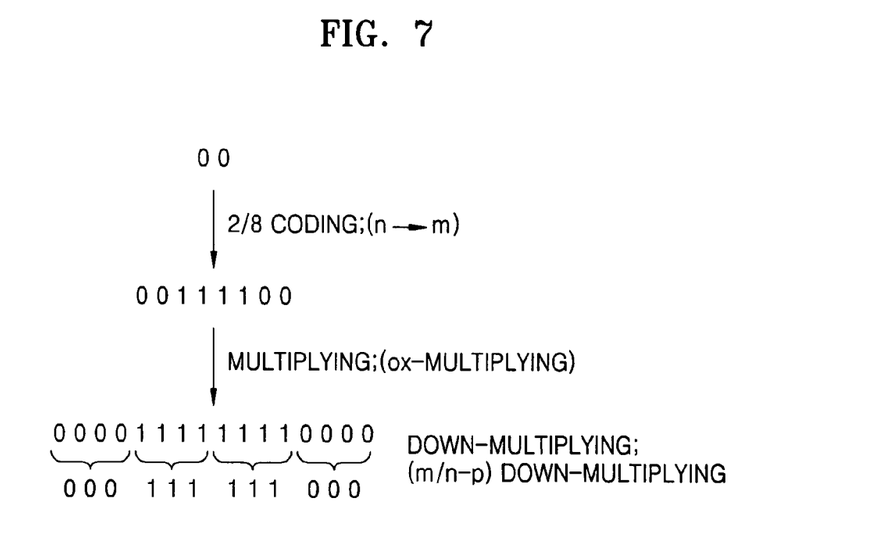
FIG. 7 illustrates a servo data forming method according to an embodiment of the present invention.

FIG. 7 illustrates a servo data forming method according to an embodiment of the present invention.

According to a conventional method, servo data is partial response maximum likelihood (PRML)-coded into m bits in n-bit units, and each bit of the PRML-coded result is multiplied by an o multiple. Here, n is a multiple of 1, m is a multiple of 4, and o is a multiple of 2.

A bitstream obtained from the multiplying process may be down-multiplied to ((m/n)−p) bits in m/n-bit units. Here, it is preferable, though not necessary, that p is 1.

Referring to FIG. 7, in the servo data forming method of this embodiment, the capacity of the buffer memory can be reduced by down-multiplying the bitstream multiplied by the o multiple for each bit to ((m/n)−p) bits in m/n-bit units.

As a result of the 2/8-coding, one bit of the servo data is converted to at least one of "0000," "0011," "1100" and "1111." Then, as a result of the 2-multiplying, one bit of the servo data is converted to at least one of "00000000," "00001111," "11110000" and "11111111."

If the 2/8-coded and 2-multiplied bitstream is down-multiplied to 3 bits in 4 (=8/2)-bit units, the length of the bitstream used in the servo data, i.e., the capacity of the memory, can be reduced while the contents of the servo data are maintained.

If the conventional servo data is comprised of 160 bits, a buffer memory of 120 bytes can be used in the servo data forming method of the present embodiment of the invention, while a buffer memory of 160 bytes is required in the conventional method. This indicates that the capacity of the buffer memory is reduced by 25% compared to the conventional method.

According to the servo data forming method, the effect is such that the frequency of the servo data written on a disc is changed without changing a clock signal frequency. That is, compared to the conventional servo data writing method, the servo data is reduced by 25%. Accordingly, the frequency of the servo data is changed by 25%.

To maintain the frequency of the servo data equal to the conventional frequency, the clock signal frequency used to read from the buffer memory is changed.

For example, when 4 bits is down-multiplied to 3 bits, the frequency of the servo data written on a disc can be made equal to the conventional frequency by lowering the clock signal frequency used to read from the buffer memory by ¾ times the frequency f used to read the 4 bits. That is, an identity between a servo writer and an HDD can be maintained by identically maintaining the write frequency.

Figure 8:
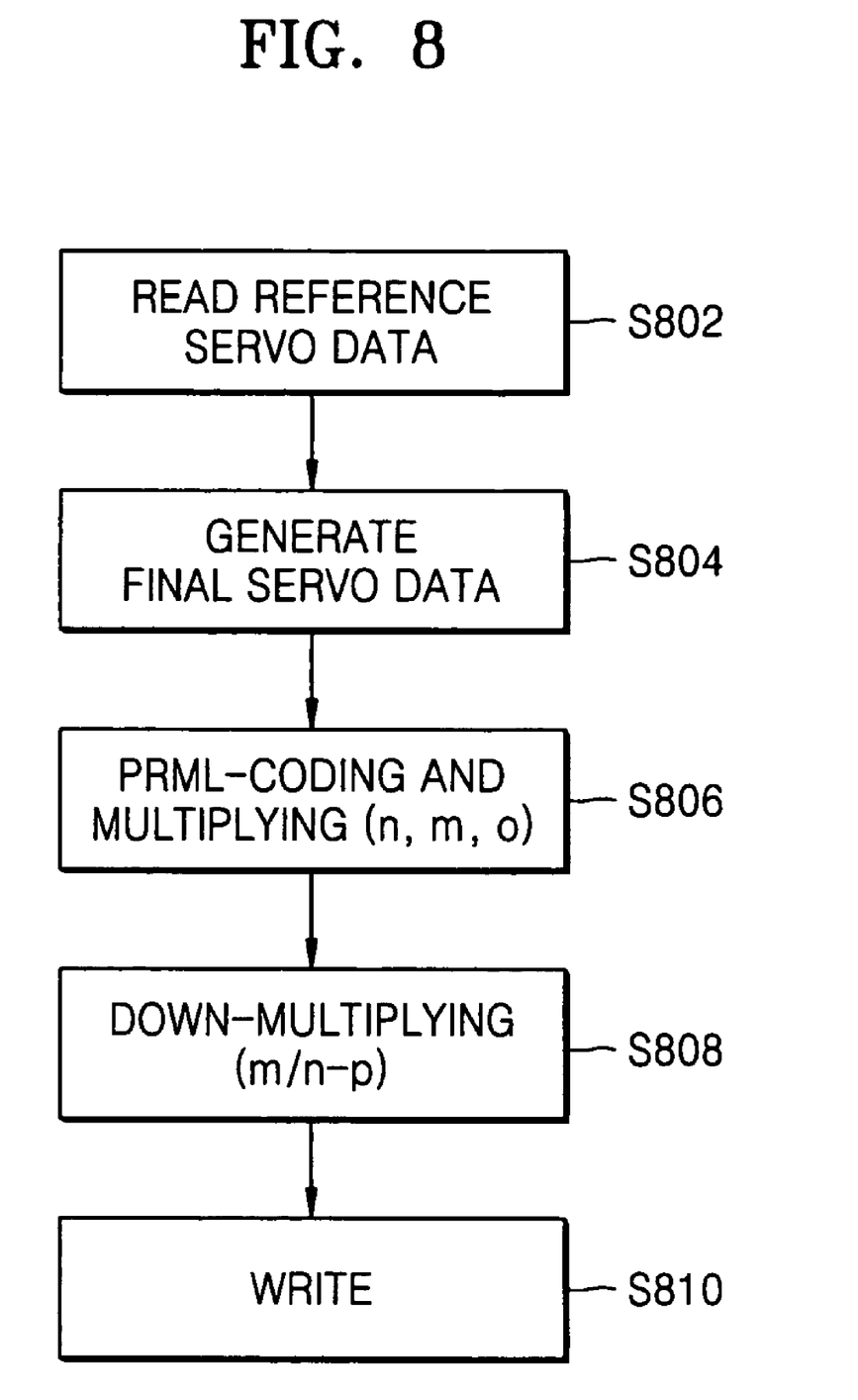
FIG. 8 is a flowchart illustrating a self-servo write method according to an embodiment of the present invention.

FIG. 8 is a flowchart illustrating a self-servo write method according to an embodiment of the present invention.

Referring to FIG. 8, reference servo data is read in operation S802.

The reference servo data is read based on reference servo data of a reference disc.

Final servo data is formed based on the reference servo data in operation S804. In the final servo data, sector address information and RRO information is changed in reference to the reference servo data.

In operation S806, the final servo data may be PRML-coded into m bits in n-bit units, and each bit of the PRML-coded result is multiplied by an o multiple.

A bitstream obtained in operation S806 is converted, i.e., down-multiplied, to ((m/n)−p) bits in m/n-bit units in operation S808.

In operation S810, the bitstream obtained in operation S808 is written by synchronizing with a clock signal having a frequency f used to write the bitstream obtained in operation S806.

Here, if it is desired to maintain the identity of a write length of a write area in which the final servo data is written, the bitstream obtained in operation S806 is written using a clock signal whose frequency is changed according to the down-multiplying.

That is, a clock signal having a frequency of (m/n)/((m/n)−p)*f is generated, and the bitstream obtained in operation S806 is written by synchronizing with the clock signal having the frequency of (m/n)/((m/n)−p)*f.

The self-servo write method will now be described with reference to FIG. 2. The write/read channel 220 forms final servo data based on reference servo data read from a reference disc. That is, the write/read channel 220 PRML-codes the final servo data into m bits in n-bit units, multiplies each bit of the PRML-coded result by an o multiple, and down-multiplies a bitstream obtained in the multiplying into ((m/n)−p) bits in (m/n)-bit units.

The bitstream obtained in the down-multiplying is buffered in the buffer memory of the write/read channel 220. The final servo data stored in the buffer memory is read based on a clock signal whose frequency is changed according to the down-multiplying, and the read final servo data is provided to the pre-amplifier 210.

The present invention can be realized as a method, an apparatus, and/or a system. In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

As described above, according to a self-servo write method according to embodiments of the present invention, by down-multiplying servo data, storing a down-multiplied bitstream in a buffer memory, and reading and writing the bitstream stored in the buffer memory based on a clock signal whose frequency is changed according to the multiplying rate, the capacity of the buffer memory used to buffer the servo data can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A servo data forming method comprising: partial response maximum likelihood (PRML)-coding servo data into m bits in n-bit units; multiplying each bit of the PRML-coded result by an o multiple; and converting a bitstream obtained in the multiplying to ((m/n)−p) bits in m/n−bit units, wherein p is a multiple used for converting the bitstream.

2. The method of claim 1, wherein p is less than o.

3. The method of claim 2, wherein o is 2, and p is 1.

4. A self-servo write method comprising: partial response maximum likelihood (PRML)-coding servo data into m bits in n-bit units; multiplying each bit of the PRML-coded servo data by an o multiple; down-multiplying by a p multiple, a bitstream obtained in the multiplying to ((m/n)−p) bits in m/n−bit units; and writing the bitstream obtained in the down-multiplying by synchronizing with a clock signal having a frequency f used to write the bitstream obtained in the multiplying.

5. The method of claim 4, further comprising:
generating a clock signal having a frequency of (m/n)/((m/n)−p)*f; and
writing the bitstream obtained in the multiplying by synchronizing with the clock signal having the frequency of (m/n)/((m/n)−p)*f.

6. The method of claim 4, wherein p is less than o.

7. The method of claim 6, wherein o is 2, and p is 1.

8. A computer readable medium storing instructions that control at least one processor to perform a method of forming servo data, the method comprising: partial response maximum likelihood (PRML)-coding servo data into m bits in n-bit units; multiplying each bit of the PRML-coded result by an o multiple; and converting a bitstream obtained in the multiplying to ((m/n)−p) bits in m/n−bit units, wherein p is a multiple used for converting the bitstream.

9. The method of claim 8, wherein p is less than o.

10. The method of claim 9, wherein o is 2, and p is 1.

11. A method of forming servo data, the method comprising: converting a bitstream of partial response maximum likelihood (PRML)-coded servo data, in which each bit has been repeated by a predetermined multiple, into a reduced bitstream of m/n-p bits in m/n-bit units; wherein p is a multiple used for converting the bitstream into the reduced bitstream; and wherein the PRML-coded servo data comprises m bits in n-bit units.

12. The method of claim 11, wherein p is less than the predetermined multiple.

13. The method of claim 12, wherein the predetermined multiple is 2, and p is 1.

14. A self-servo write method comprising: converting a bitstream of partial response maximum likelihood (PRML)- coded servo data, in which each bit has been repeated by a predetermined multiple, into a reduced bitstream of m/n−p bits in m/n bit units; wherein p is a multiple used for converting the bitstream into the reduced bitstream; and writing the reduced bitstream by synchronizing with a clock signal having a frequency f used to write the servo data; wherein the PRML-coded servo data comprises m bits in n-bit units.

15. The method of claim 14, further comprising:
generating a clock signal having a frequency of (m/n)/((m/n)−p)*f; and
writing the reduced bitstream by synchronizing with the clock signal having the frequency of (m/n)/((m/n)−p)*f.

16. The method of claim 14, wherein p is less than the predetermined multiple.

17. The method of claim 16, wherein the predetermined multiple is 2, and p is 1.

18. A method of forming servo data, the method comprising:
converting a bitstream of partial response maximum likelihood (PRML)-coded servo data, in which each bit has been repeated by a predetermined multiple, into a reduced bitstream;
wherein the reduced bitstream comprises units of bits that are each at least one bit shorter than units of bits of the bitstream of PRML-coded servo data.

* * * * *

UNITED STATES PATENT AND TRADEMARK OFFICE
CERTIFICATE OF CORRECTION

| | |
|---|---|
| PATENT NO. | : 7,663,830 B2 |
| APPLICATION NO. | : 11/325576 |
| DATED | : February 16, 2010 |
| INVENTOR(S) | : Ki-Hyun Jo et al. |

It is certified that error appears in the above-identified patent and that said Letters Patent is hereby corrected as shown below:

On the Title Page

Item (57) (Abstract), Line 5, change "bitsream" to --bitstream--.

Column 8, Line 58, change "m/n-p" to --((m/n)-p)--.

Column 9, Line 2, change "m/n-p" to --((m/n)-p)--.

Column 9, Line 3, change "m/n bit" to --m/n-bit--.

Column 9, Line 6, before "servo" insert --coded--.

Page 1 of 1

Signed and Sealed this

Fourth Day of May, 2010

David J. Kappos
*Director of the United States Patent and Trademark Office*